Figure 1:
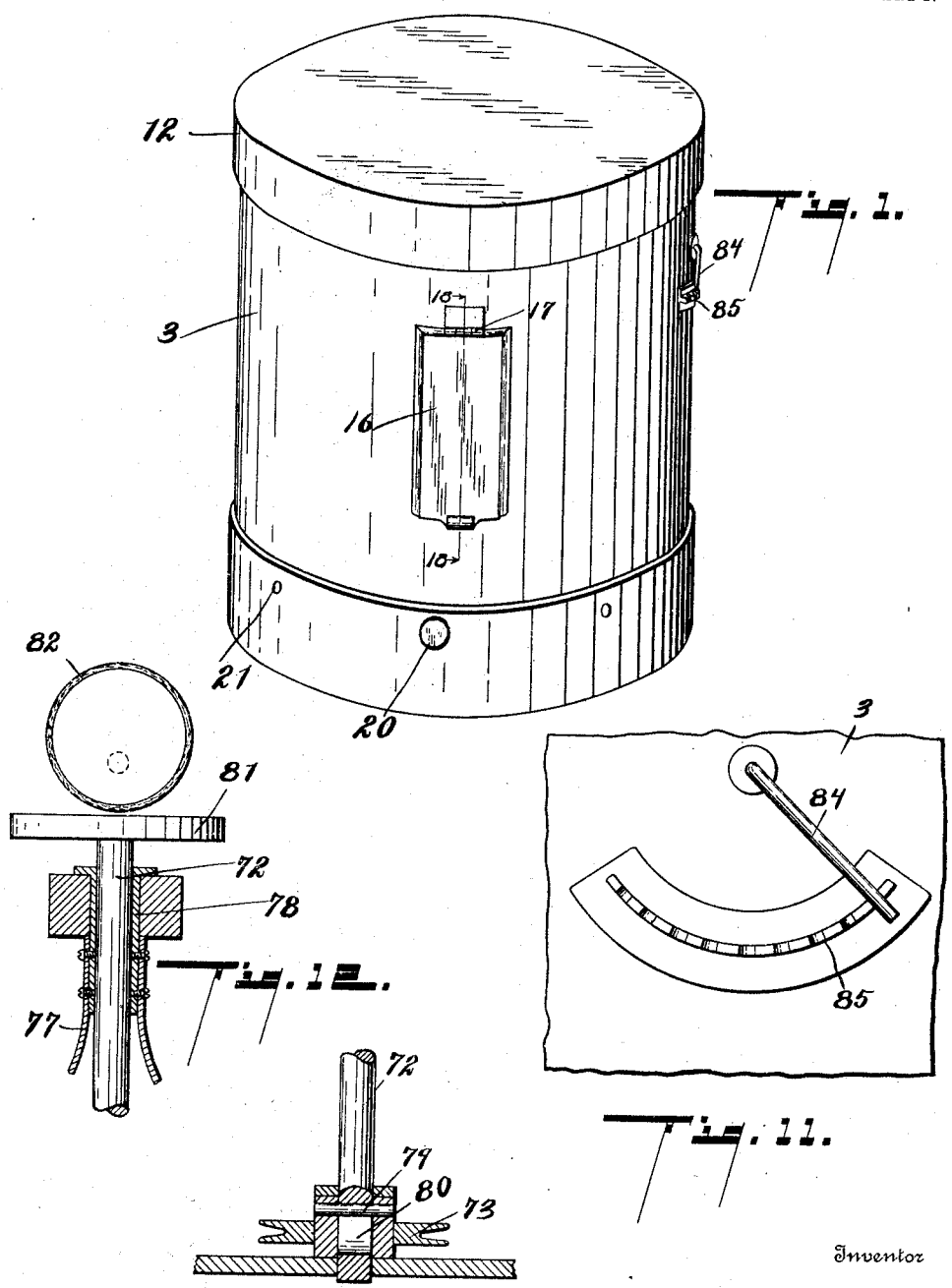

I. O. PERRING.
CAMERA.
APPLICATION FILED NOV. 26, 1909.

976,208.

Patented Nov. 22, 1910.
9 SHEETS—SHEET 2.

I. O. PERRING.
CAMERA.
APPLICATION FILED NOV. 26, 1909.

976,208.

Patented Nov. 22, 1910.

9 SHEETS—SHEET 3.

Witnesses
L. G. Greenfield
F. G. Tallman

Inventor
Ira O. Perring
By Chappell & Earl
Attorneys

I. O. PERRING.
CAMERA.
APPLICATION FILED NOV. 26, 1909.

976,208.

Patented Nov. 22, 1910.
9 SHEETS—SHEET 4.

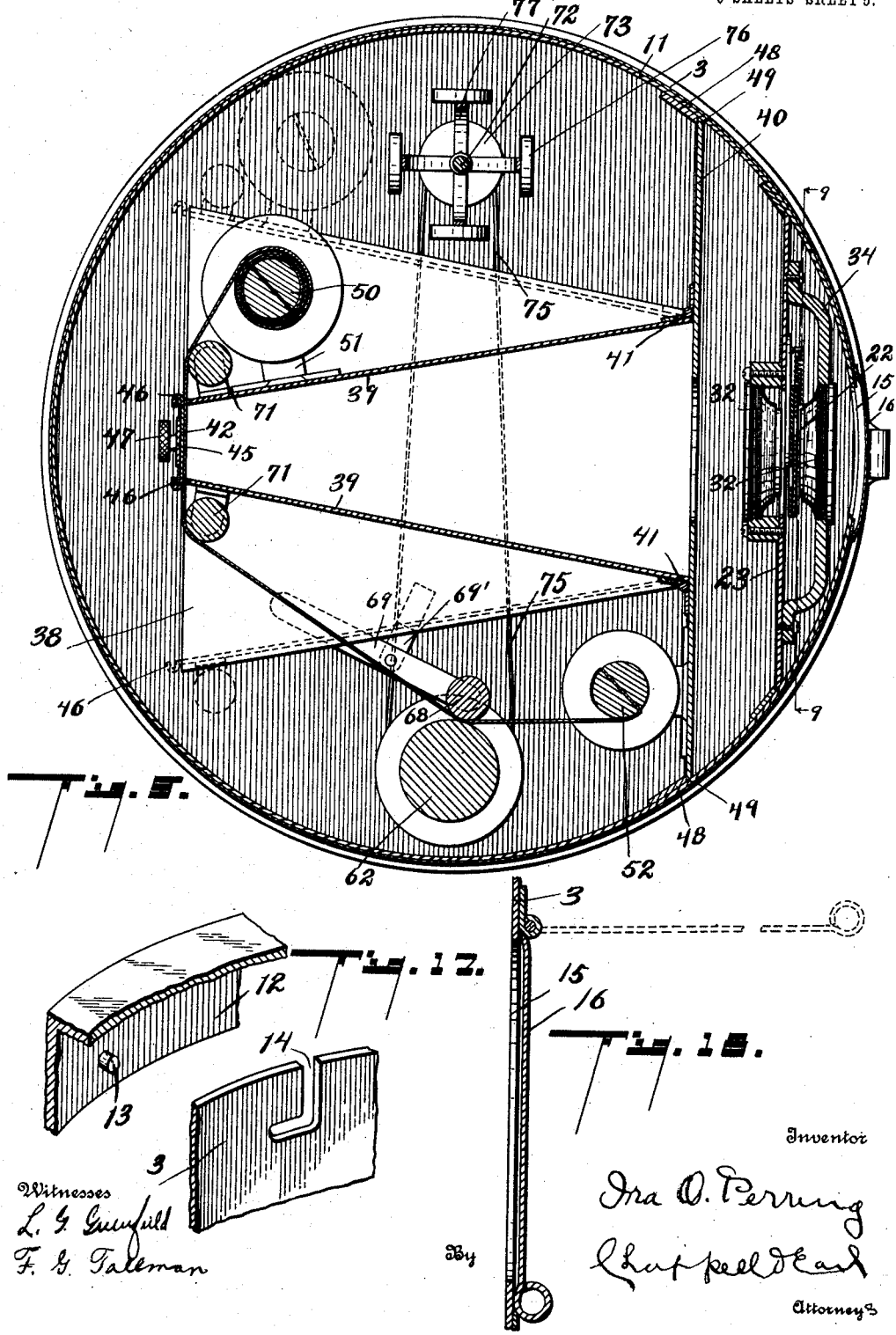

I. O. PERRING.
CAMERA.
APPLICATION FILED NOV. 26, 1909.
976,208.
Patented Nov. 22, 1910.
9 SHEETS—SHEET 6.
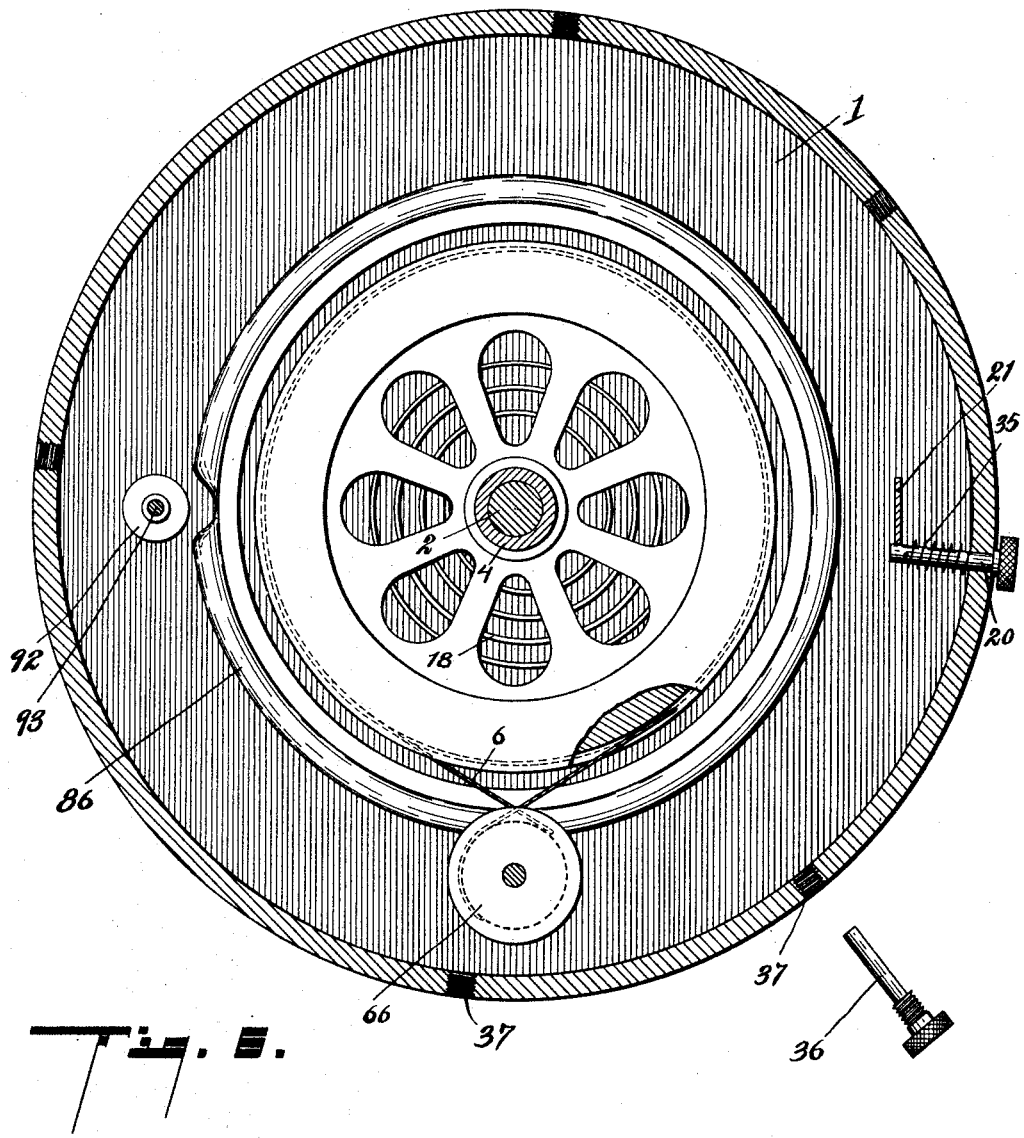

I. O. PERRING.
CAMERA.
APPLICATION FILED NOV. 26, 1909.
976,208.
Patented Nov. 22, 1910.
9 SHEETS—SHEET 7.
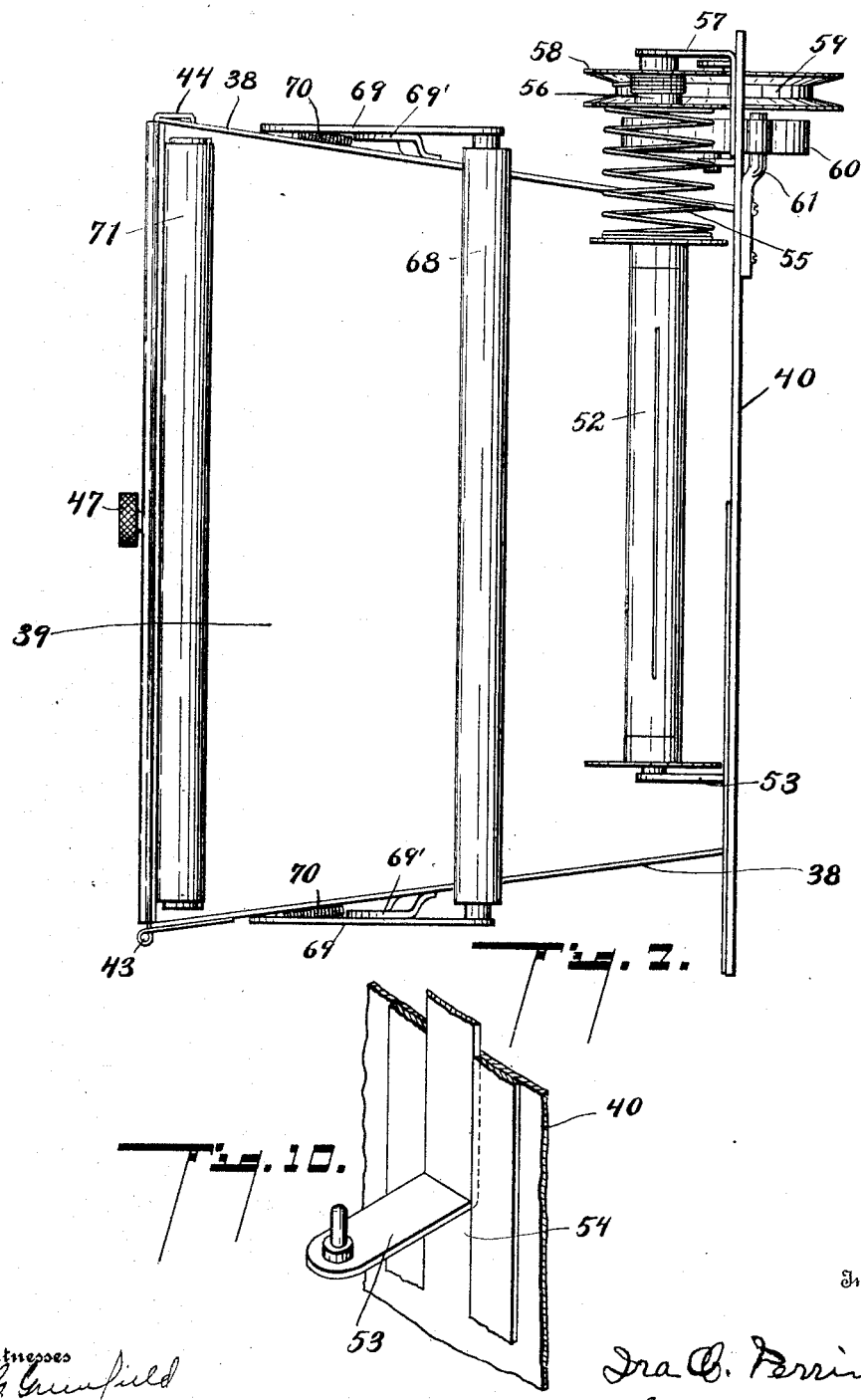

I. O. PERRING.
CAMERA.
APPLICATION FILED NOV. 26, 1909.
976,208.
Patented Nov. 22, 1910.
9 SHEETS—SHEET 8.
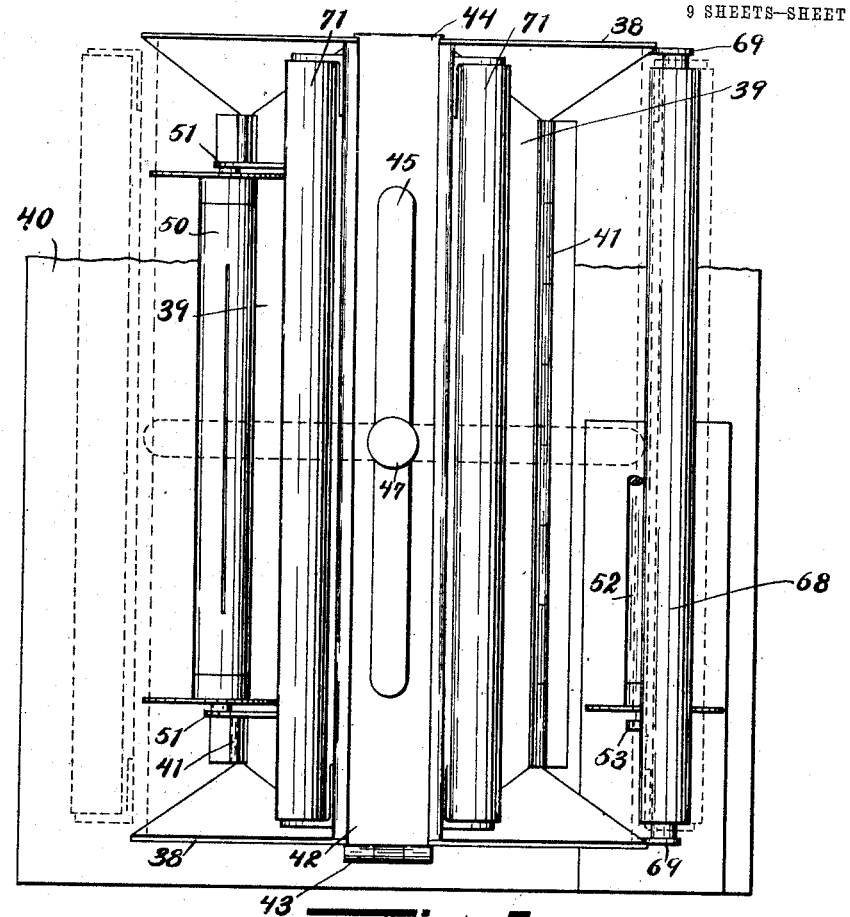
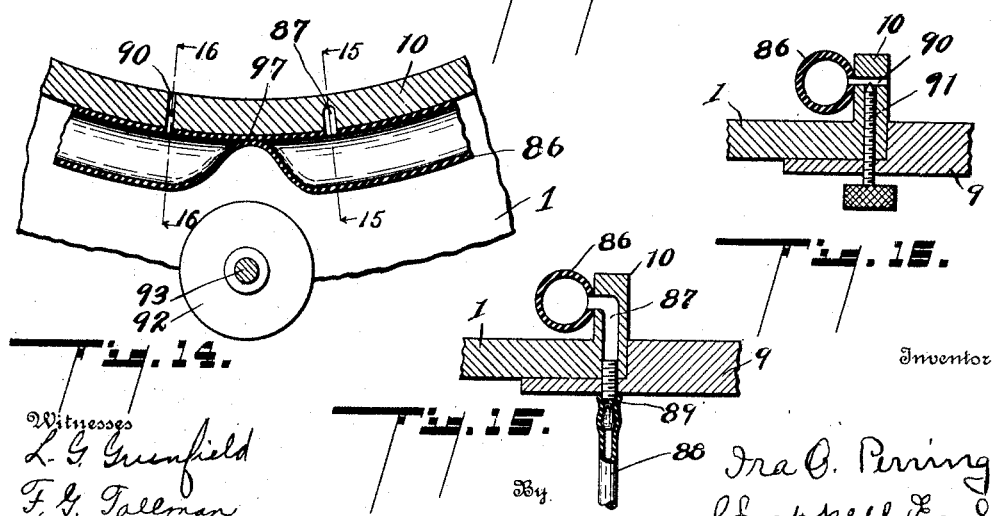

I. O. PERRING.
CAMERA.
APPLICATION FILED NOV. 26, 1909.
976,208.
Patented Nov. 22, 1910.
9 SHEETS—SHEET 9.
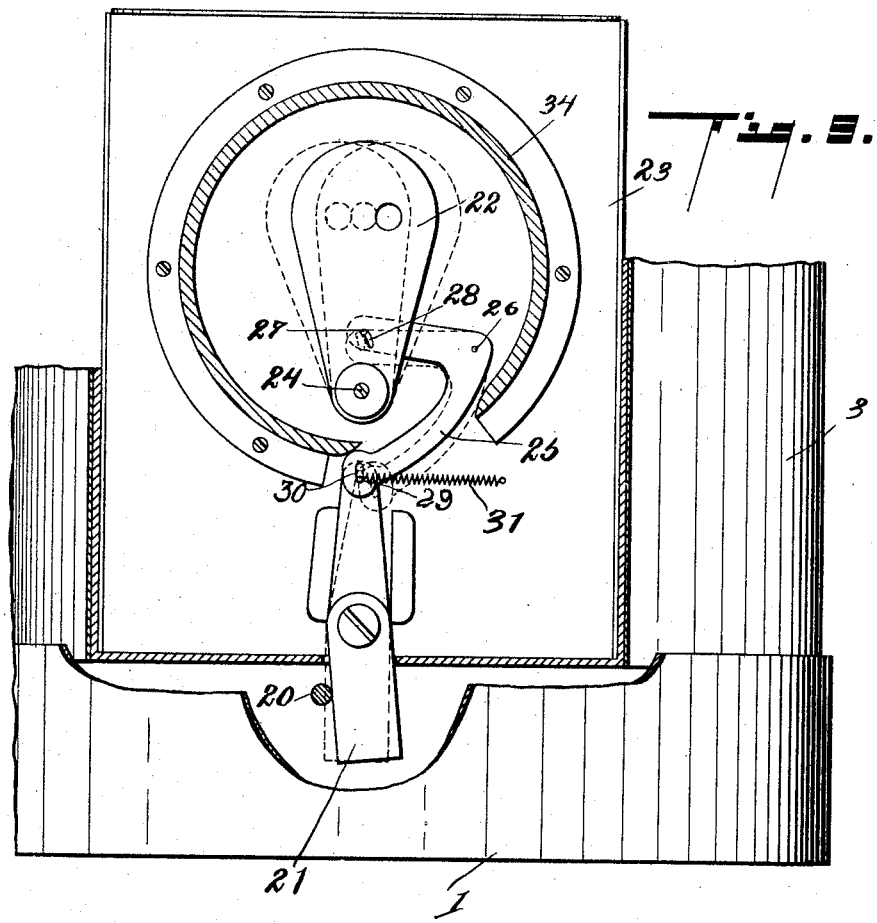
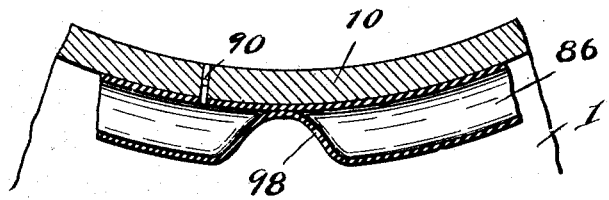

UNITED STATES PATENT OFFICE.

IRA O. PERRING, OF KALAMAZOO, MICHIGAN.

CAMERA.

976,208.   Specification of Letters Patent.   Patented Nov. 22, 1910.

Application filed November 26, 1909. Serial No. 529,963.

*To all whom it may concern:*

Be it known that I, IRA O. PERRING, a citizen of the United States, residing at Kalamazoo, Michigan, have invented certain new and useful Improvements in Cameras, of which the following is a specification.

This invention relates to improvements in cameras.

My present improvements relate mainly to a panoramic camera of the type shown in Letters Patent No. 941,688, dated November 30, 1909, issued to me, and is a modification in various details, and in some respects an improvement, upon the structure there illustrated, one of the features of my present improvements being to provide a camera which may be adjusted for use either as a panoramic camera or as a regular camera.

The main objects of this invention are, first, to provide an improved panoramic camera which is very simple in its operation and one which may be very accurately controlled and governed. Second, to provide in a panoramic camera an improved governor mechanism or means for automatically regulating or timing the exposure. Third, to provide an improved panoramic camera by which extensive views may be taken. Fourth, to provide in a panoramic camera an improved means for feeding or shifting the films. Fifth, to provide an improved panoramic camera which may be operated with practically no vibration. Sixth, to provide an improved camera which may be quickly adjusted for use as a panoramic or as a regular type of camera. Seventh, to provide an improved camera which is comparatively simple and economical is structure and which is not likely to get out of repair in use.

Further objects, and objects relating to structural details, will definitely appear from the detailed description to follow.

I accomplish the objects of my invention by the devices and means described in the following specification.

The structure described constitutes one effective embodiment of my invention. Other embodiments would be readily devised by those skilled in the art.

The invention is clearly defined and pointed out in the claims.

Figure 2:
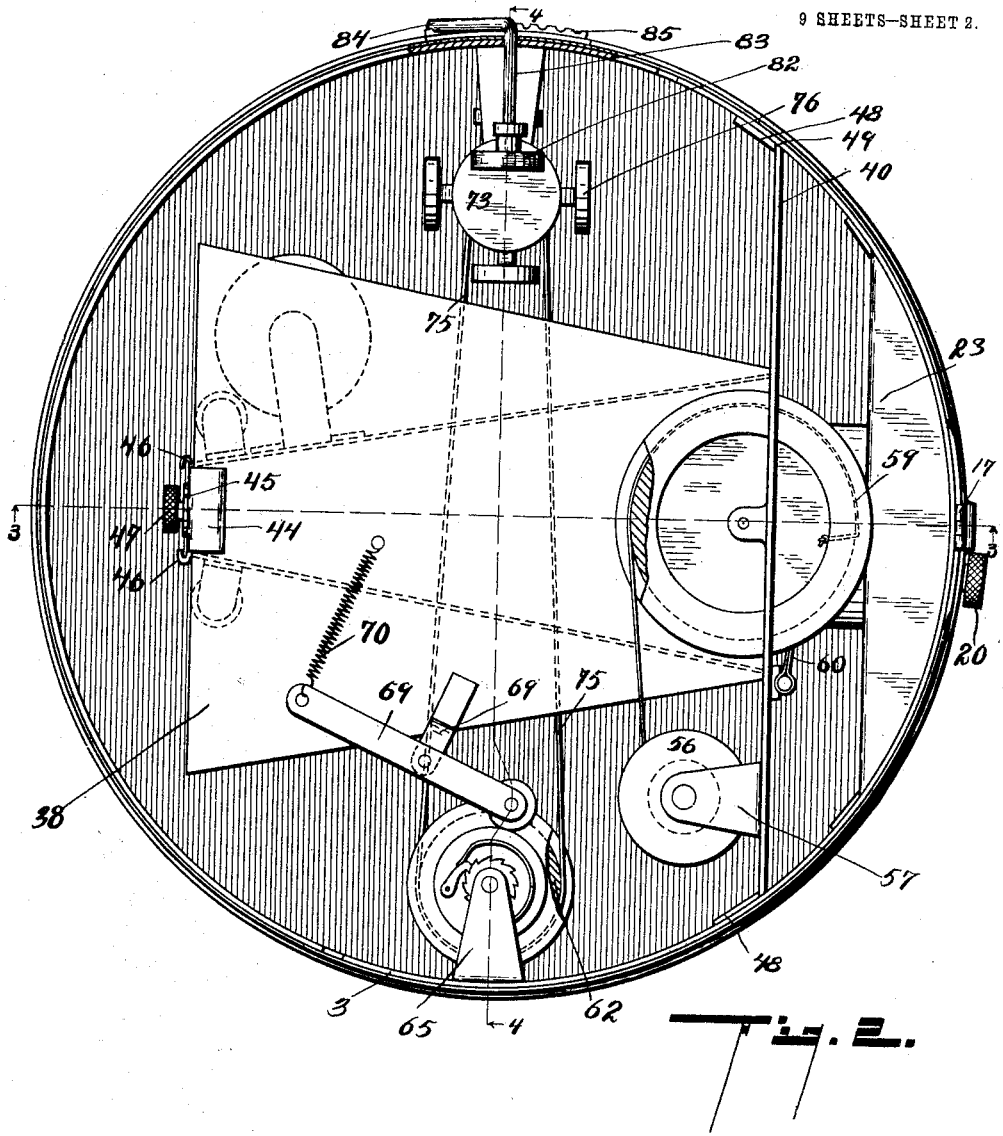
Figure 3:
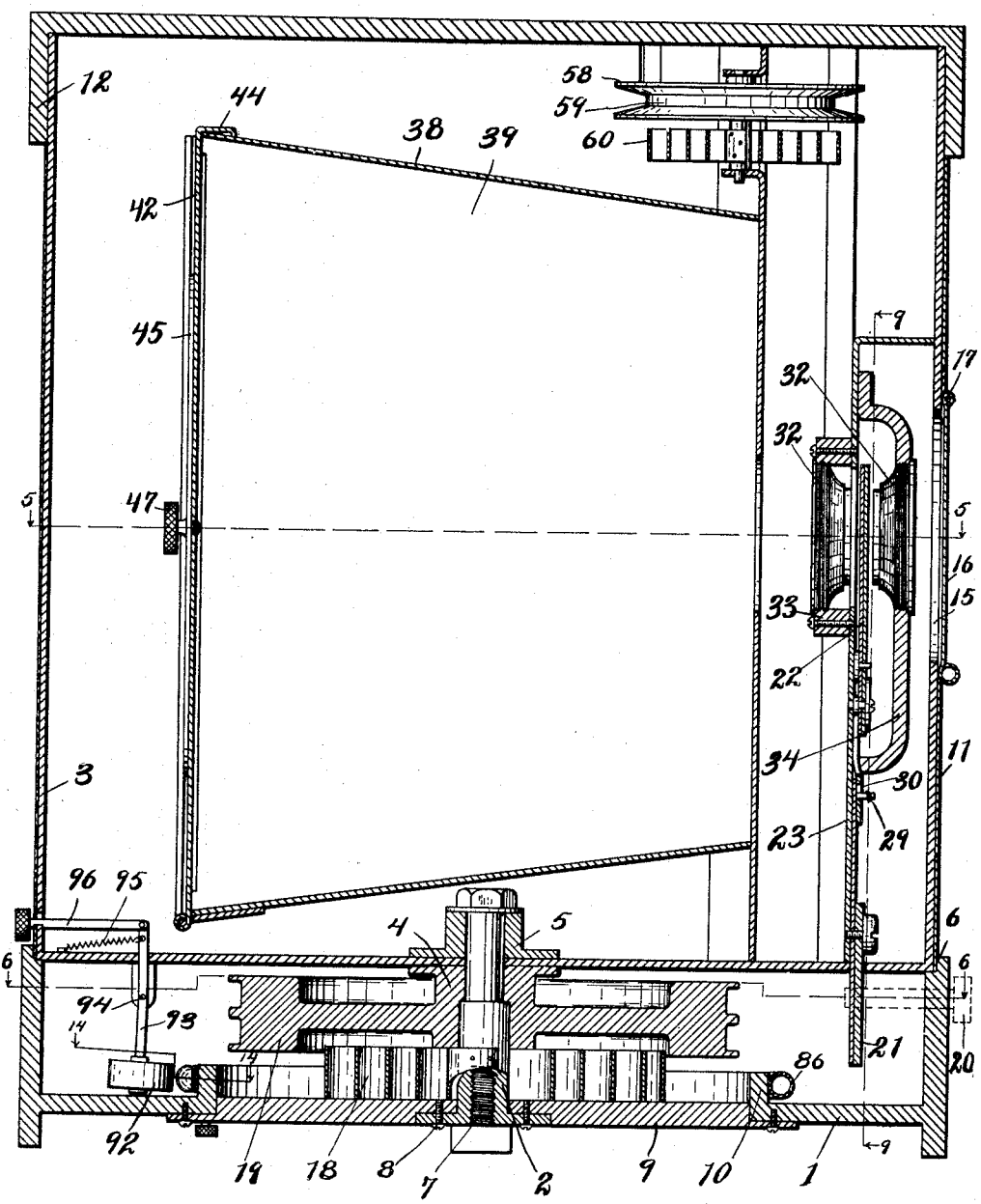
Figure 4:
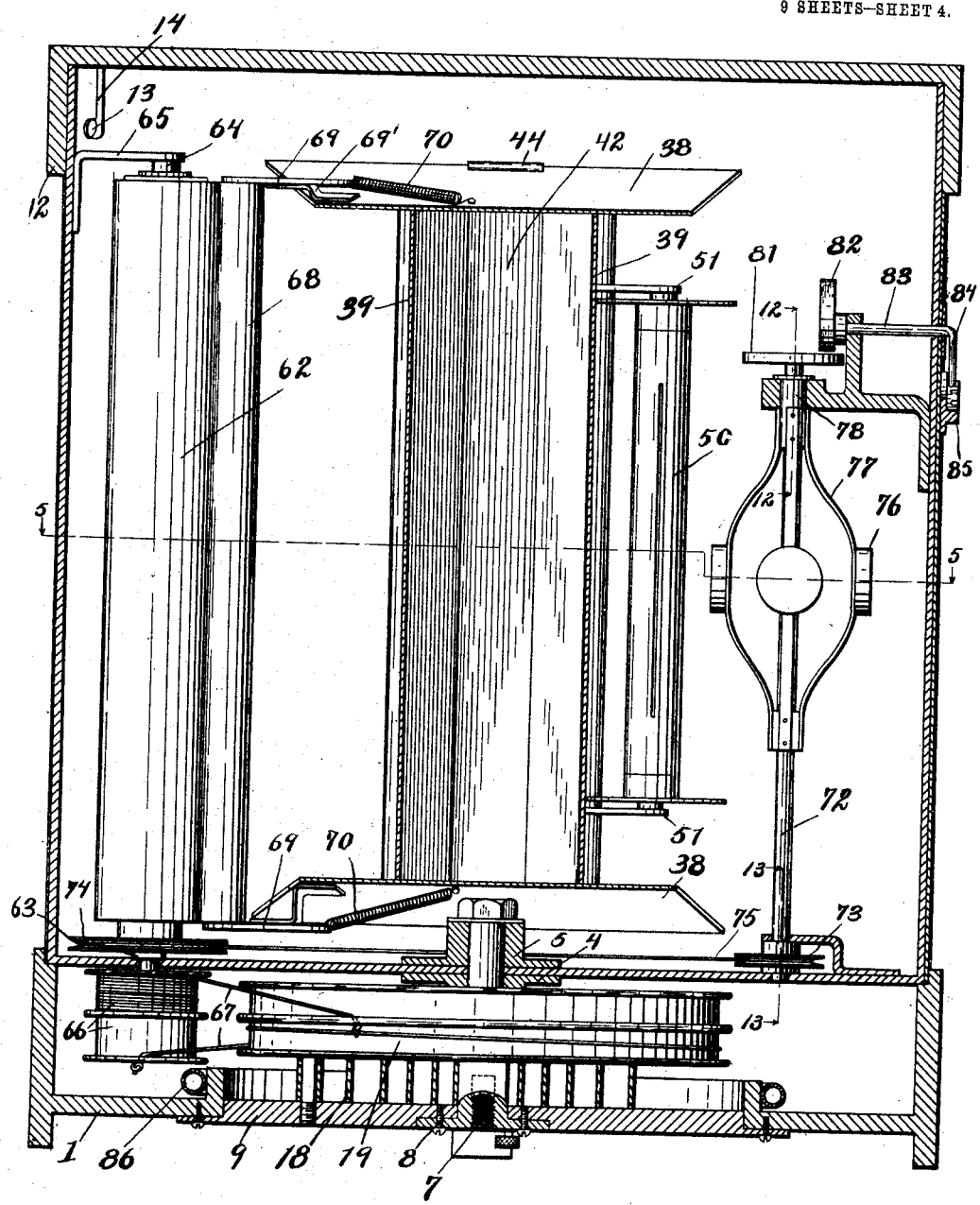

A structure constituting an effective and preferred embodiment of the features of my invention is clearly illustrated in the accompanying drawing, forming a part of this specification in which:

Figure 1 is a perspective view of a structure embodying the features of my invention. Fig. 2 is a plan view with the cover of the casing removed, portions of the driving parts being broken away to show structural details. Fig. 3 is a vertical section from front to rear, taken on a line corresponding to line 3—3 of Fig. 2, portions being shown in full lines to better illustrate their form. Fig. 4 is a vertical section from side to side, taken on a line corresponding to line 4—4 of Fig. 2, portions being shown in full lines to better illustrate their form. Fig. 5 is a horizontal section taken on a line corresponding to the line 5—5 of Figs. 3 and 4, with parts shown in full lines. Fig. 6 is a horizontal section taken on a line corresponding to line 6—6 of Fig. 3. Fig. 7 is a side elevation of the camera box removed from the casing, showing the arrangement of the parts mounted on one side thereof. Fig. 8 is a rear view of the camera box, the adjustment thereof being shown by dotted lines, the upper end of the front wall of the box and parts mounted thereon being broken away. Fig. 9 is a detail view partially in vertical section, on a line corresponding to line 9—9 of Fig. 3, showing the arrangement of the shutters and the lens plate. Fig. 10 is a detail perspective view showing the lower bearing and the bearing support for the film-receiving roller. Fig. 11 is a detail side elevation showing the governor adjusting lever. Fig. 12 is an enlarged detail, partially in vertical section, on line corresponding to line 12—12 of Fig. 4, of the brake mechanism. Fig. 13 is an enlarged detail, partially in vertical section, on line corresponding to line 13—13 of Fig. 4. Fig. 14 is an enlarged detail horizontal section taken on a line corresponding to line 14—14 of Fig. 3, showing details of the pneumatic brake. Fig. 15 is an enlarged detail taken on a line corresponding to line 15—15 of Fig. 14. Fig. 16 is an enlarged detail taken on line corresponding to line 16—16 of Fig. 14. Fig. 17 is an enlarged detail perspective of the casing cover and the upper edge of the casing showing the means for securing the cover. Fig. 18 is an enlarged detail vertical section of the exposure opening of the casing and its closure, the open positions of the closure being shown by dotted lines. Fig. 19 is a detail section showing a modified form of the pneumatic brake tube, the modification being in the means for admitting the air to the tube.

Referring to the drawing, the base is provided with a central bearing post or stud on which the casing 3 is revolubly mounted. The casing is secured to the hub like bearing 4 which is arranged on the post in the base. A bearing member 5 is preferably provided for the casing in addition to the bearing 4. The base is also preferably provided with a rabbet-like way 6, adapted to receive the edge of the casing, as clearly appears in Fig. 3. The post 2 is preferably provided with a threaded hole 7 adapted to receive the screw of a tripod. For convenience in manufacture, the post 2 is removably secured by means of screws 8 to the removable plate 9 of the base. This removable plate 9 is provided for convenience in assembling the parts. The base is preferably provided with an upwardly turned annular flange 10 about the opening for the plate 9, the object of which will appear as the description proceeds.

The casing 3 is preferably cylindrical and formed of metal. The casing illustrated is provided with a leather or other suitable covering 11. The casing is provided with a removable cover 12, having a downwardly projecting flange-like rim adapted to receive the upper end of the casing. The flange of the cover is preferably provided with pins 13 adapted to engage the bayonet slot 14 in the upper edge of the casing, thereby affording a convenient means for securing the cover in position. (See Fig. 17). The casing is provided at one side with an exposure opening 15. The closure 16 for this opening is preferably hinged at its upper edge, as at 17. (See the enlarged detail in Fig. 18). The casing 3 is driven or revolved by means of the spring 18, one end of which is secured to the casing bearing 4 and the other end to the base. By turning the casing in one direction the spring is wound, and when released it revolves the casing in the opposite direction. A drum 19 is carried by the bearing 4 or otherwise connected to the casing to revolve therewith. The casing is held in its set position by means of the pin 20 which is arranged through the base to engage the shutter actuating lever 21. This shutter actuating lever projects through the bottom of the casing into the base. (See Fig. 3). The shutter (see Figs. 3, 5 and 9) preferably consists of a pair of similarly shaped members 22 which are mounted on the lens plate 23 by means of a pivot 24. These shutters are actuated through the bent lever 25 which is pivoted at 26 on the lens plate, one end of the lever being connected to the shutter members by the pin 27 which engages the slots 28 therein, and the other end being connected to the upper end of the lever 21 by means of a pin and slot connection, the lever 21 being provided with a pin 29 which engages the slot 30 in the bent lever. The spring 31 is connected to the lever 21 and serves to open the shutter when the actuating lever 21 is released.

The lenses 32 are mounted in suitable supports 33 and 34 respectively, on the lens plate. These lenses are preferably what is generally known as universal focus lenses, although they may be of any type desired.

The stop 20 is preferably held yielding in its engaging position by means of a spring 35 so that when it is released it moves into position to engage the shutter-actuating lever to close the shutter and stop the casing. Supplementary stops 36 are preferably provided which are adapted to be inserted in the holes 37 in the casing to close the shutter at any point. These of course can be spaced as desired. The stops 36 are preferably threaded into the holes 37 in order to prevent accidental displacement thereof. (See Fig. 6).

The camera box is preferably made up of top and bottom walls 38, side walls 39 and front wall 40, the side walls being pivoted to the front walls at 41 to be adjusted thereon between the top and bottom walls, as clearly appears in Fig. 5. (See also Fig. 8). A bar-like back piece 42 is hinged at 43 to the bottom wall, and the upper end of this back piece is provided with a flange-like hook 44 adapted to engage the top wall. (See Figs. 7 and 8). This back piece is adapted to be swung down to permit the placing of the films. To spread the side walls I preferably arrange on this back piece a bar-like wall spreader member 45. This member is adapted to engage the grooves 46 in the side walls, so that when the bar is turned to a horizontal position the side walls are spread and supported in their spread position. These grooves 46 are adapted to engage the edges of the back piece 44 when in their closed positions. A finger piece 47 is preferably provided for spread member 4. By thus forming the box it may be readily adjusted so that the camera can be adjusted for use as an ordinary camera, or as a panoramic camera. The camera box is preferably removably supported in the casing by means of vertical strips 48 which coact with the wall of the casing in forming vertical grooves 49 adapted to receive the ends of the front wall 40 of the box, whereby the box is removably supported in the casing.

A film delivery roller 50 is mounted upon one of the side walls of the camera box, suitable bracket-like arms 51 for supporting the same thereon being provided. The film receiving roller 52 is mounted on the opposite side of the box on the front wall of the box.

The film receiving roller 52 is preferably supported at its lower end by the adjustable bearing support 53 which is in the form of an angle-shaped bracket, having one arm arranged in the vertical slide way 54 provided therefor on the casing wall. (See Figs. 7 and 10). The upper end of this roller is supported by the spring 55. The spring 55 is arranged with its lower end engaged with the roller and is connected to the pulley 56, the pulley being supported by the arm 57 projecting over the bracket 53. This pulley 56 is connected by the driving cord or cable 58 to the drum 59, as clearly appears in Figs. 2, 3, and 7. The drum 59 is driven through a spring 60, one end of the spring being connected to the drum and the other to a supporting pin 61 on the camera box. When the camera is set the spring is wound and the film being connected to the receiving roller is held under tension and the receiving roller is revolved to wind the film.

The film is illustrated in conventional form in Fig. 5 to show its arrangement in operating the camera. A feed roll 62 is provided for the film. The shaft 63 of this roller is journaled in the bottom of the casing and in the bearing 64 carried by the arm 65. (See Fig. 4 of the drawing). On the lower end of the shaft 63 is the drum 66 for the driving cords or cables 67. These cords or cables are oppositely wound on the drum 66, and also on the drum 19, so that as the casing is revolved to wind the driving spring, one of the cables is wound on the drum 19 and the other on the drum 66. Each of these drums is provided with a central circumferential flange to prevent the cables over-lying each other as they are wound and unwound. The feed roller is thus driven directly through the driving of the casing, and therefore its speed is regulated or timed therewith, the same as in the structure of my application referred to. The advantage of this driving connection over that shown is that accurate gears are not required and there is no vibration in the present structure, as is likely to result from looseness or inaccuracies in the gears, and the feed movement of the film is even and continuous. A pressure roller 68 is preferably provided to coact with the feed roller. This pressure roller is preferably mounted on the pivoted arms 69, carried by suitable brackets 69' on the top and bottom walls of the camera box. The springs 70 are for holding the roller yieldingly against the film. (See Figs. 2 and 4.) Guide rollers 71 are preferably provided for guiding the film across the box opening. These rollers are supported on the side walls of the box, so that they are effective with the box adjusted in either position.

To regulate and control the speed of the camera when the same is used as a panoramic camera, I provide a governor device, preferably consisting of the shaft 72, having a pulley 73 on its lower end, which is connected to the pulley 74 on the shaft 63 of the feed roller, by means of the belt 75. On this shaft 72 are governor weights 76, which are supported by the springs 77. These springs are secured at their upper ends to the bearing 78 and at their lower ends to the shaft 72. (See Figs. 4, 12 and 13). The shaft 72 is connected by the pin 79 to the pulley 73, the pin engaging a slot 80 in the shaft, so that the shaft is lifted by the governor weights when the speed is sufficient to throw the disk 81 into contact with the coacting friction member 82. This is, for convenience in adjustment, preferably a cam mounted on the shaft or crank 83, the outer end of which projects through the casing and is bent down to form a finger piece 84. A segment 85 is provided for holding this finger piece adjustably in position. (See Figs. 1, 4 and 11). To supplement this governor mechanism I preferably provide a second governing or control means consisting of a pneumatic tube 86, which is arranged about and supported by the upwardly projecting flange 10 on the base 1. This tube is connected through the passage 87 to the supply pipe 88, by means of which the tube may be inflated, the passage 87 being preferably provided with a nipple 89 to receive the tube 88. (See Fig. 15). The discharge passage 90 for the tube is preferably controlled by means of the valve 91.

Carried by the casing is a roller 92, the spindle 93 of which is pivoted at 94 so that the roller may be thrown into engagement with the tube and drive the air therefrom through the port 90, as the casing revolves the size of the port regulating the escape of air, determining the speed of the casing. The roller is preferably held yielding in engagement with the tube by means of a spring 95, (see Fig. 3). A finger piece 96 is provided for throwing the roller out of its engaging position. The walls of the tube are secured together at 97 between the inlet and discharge ports, thereby forming in effect a partition.

In the modified structure shown in Fig. 19, the inflation connection is omitted, an inlet port 98 being provided for the admission of air behind the roller 92. The structure of this modification is quite satisfactory, as atmospheric pressure in the tube is sufficient to secure satisfactory results in retarding and controlling the movement of the casing, although the inflation connection insures the complete opening of the tube and prevents collapsing thereof, and will open it up to its full capacity should the walls of the tube adhere after the passing of the roller.

By thus arranging the parts, I secure a panoramic camera in which the movement is very even and steady throughout its scope and one which is capable of accurate regulation. By providing the second governing means the control may be regulated to a nicety. Either governing means taken independently is quite satisfactory.

My improved camera may be quickly adjusted for use as a common camera, or for use as a panoramic camera. Its movement when operated as a panoramic camera is very even, so that very satisfactory results are secured.

I have illustrated and described my improvements in detail in the form in which I have embodied them. The same are, however, capable of very considerable modification without departing from my invention. I have not attempted to illustrate such modifications herein, as they will be readily comprehended by those skilled in the art to which this invention relates.

I desire to be understood as claiming my invention in the specific form illustrated as well as broadly within the scope of the appended claims.

Having thus described my invention, what I claim as new and desire to secure by Letters Patent is:

1. The combination with a base, of a casing, revolubly mounted thereon; a driving means for said casing; a camera box removably arranged in said casing; a lens plate removably arranged in said casing, said camera box and lens plate being independently supported; a shutter carried by said lens plate; an actuating lever therefor; spring for opening said shutter; and a stop on said base arranged to engage said lever, whereby said lever is adapted to close the shutter against the tension of its opening spring and to hold said casing in its set position.

2. The combination with a revolubly mounted casing; of a driving means for said casing; a lens plate removably arranged in said casing; a shutter carried by said lens plate; an actuating lever therefor; a spring for opening said shutter; and a stop arranged to engage said lever, whereby said lever is adapted to close the shutter against the tension of its opening spring and to hold said casing in its set position.

3. The combination with a revolubly mounted casing; of a driving means for said casing; a lens plate arranged in said casing; a shutter carried by said lens plate; an actuating lever therefor; a spring for opening said shutter; and a stop arranged to engage said lever, whereby said lever is adapted to close the shutter against the tension of its opening spring and to hold said casing in its set position.

4. The combination with a base, of a casing; a driving spring for said casing connected thereto and to said base; a lens plate removably supported in said casing; a shutter mounted upon said lens plate; a shutter opening spring; a shutter actuating lever mounted upon said lens plate; and a stop for said lever arranged on said base, adapted to close said shutter against the tension of its said opening spring and to hold said casing in its set position.

5. The combination with a base, of a casing; a driving spring for said casing connected thereto and to said base; a lens plate; a shutter mounted upon said lens plate; a shutter opening spring; a shutter actuating lever mounted upon said lens plate; and a stop for said lever arranged on said base, adapted to close said shutter against the tension of its said opening spring and to hold said casing in its set position.

6. The combination with a revolubly mounted casing; of a driving means for said casing; a lens plate; a shutter mounted upon said lens plate; a shutter opening spring; a shutter actuating lever mounted upon said lens plate; and a stop for said lever arranged on said base, adapted to close said shutter against the tension of its said opening spring and to hold said casing in its set position.

7. The combination with a base, of a casing, revolubly mounted on said base; driving means for said casing; a camera box removably arranged in said casing; a lens plate removably arranged in said casing, said lens plate being supported independently of said camera box; and a shutter mounted on said lens plate.

8. The combination with a base, of a casing, revolubly mounted on said base; driving means for said casing; a camera box arranged in said casing; a lens plate arranged in said casing, said lens plate being supported independently of said camera box; and a shutter mounted on said lens plate.

9. The combination with a casing; of a camera box removably arranged in said casing; a lens plate removably arranged in said casing, said lens plate being supported independently of said camera box; and a shutter mounted on said lens plate.

10. The combination with a revolubly mounted casing; of driving means for said casing; a lens plate arranged in said casing; a shutter mounted on said lens plate; and a stop for said casing adapted also to close said shutter.

11. The combination with a revolubly mounted casing; of a driving means for said casing; a camera box comprising relatively fixed top, bottom and front walls, side walls hinged to said front wall and arranged to swing between said top and bottom walls, a back piece hinged to said bottom wall, having a top wall engaging portion, said side walls being provided with grooves at their rear ends adapted to receive the edges of said back piece; a side wall spreader member pivotally mounted on said back piece and adapted to hold said side walls in their extended positions; a film delivery roller mounted on one of said side walls; a film receiving roller mounted on said front wall on the side of said box opposite said delivery roller, guide rollers mounted on said side walls; means for driving said receiving roller, mounted on said camera box; a feed roller mounted on said casing; driving connections therefor; and a feed pressure roller mounted on the top and bottom walls of said camera box.

12. The combination with a revolubly mounted casing; of a driving means for said casing; a camera box comprising relatively fixed top, bottom and front walls, side walls hinged to said front wall and arranged to swing between said top and bottom walls, a back piece hinged to said bottom wall, having a top wall engaging portion, said side walls being provided with grooves at their rear ends adapted to receive the edges of said back piece; a side wall spreader member pivotally mounted on said back piece and adapted to hold said side walls in their extended positions.

13. A camera box comprising relatively fixed top, bottom and front walls, side walls hinged to said front wall and arranged to swing between said top and bottom walls, a back piece hinged to said bottom wall, having a top wall engaging portion, said side walls being provided with grooves at their rear ends adapted to receive the edges of said back piece; and a side wall spreader member pivotally mounted on said back piece and adapted to hold said side walls in their extended positions.

14. A camera box comprising relatively fixed top, bottom and front walls, hinged side walls arranged to swing between said top and bottom walls, a back piece hinged to said bottom wall, having a top wall engaging portion; and a side wall spreader member pivotally mounted on said back piece and adapted to hold said side walls in their extended positions.

15. A camera box comprising relatively fixed top, bottom and front walls, side walls hinged to said front wall and arranged to swing between said top and bottom walls, a back piece hinged to said bottom wall, having a top wall engaging portion, said side walls being provided with grooves at their rear ends adapted to receive the edges of said back piece.

16. A camera box comprising relatively fixed top, bottom and front walls, hinged side walls arranged to swing between said top and bottom walls, a back piece hinged to said bottom wall, having a top wall engaging portion.

17. The combination with a revolubly mounted casing, of driving means therefor; a camera box supported within said casing and comprising relatively fixed top and bottom and front walls and adjustable side walls whereby said camera may be adjusted for use either as a panoramic or swinging camera or as a stationary camera.

18. The combination with a revolubly mounted casing, of driving means therefor; a camera box having adjustable side walls supported within said casing whereby the camera may be adjusted for use either as a panoramic or swinging camera or as a stationary camera.

19. The combination with a revolubly mounted casing; of a driving means for said casing; a camera box arranged within said casing comprising relatively fixed top, bottom and front walls, adjustable side walls arranged to swing between said top and bottom walls; a film delivery roller mounted on one of said side walls; a film receiving roller mounted on said front wall; guide rollers mounted on said front walls; means for driving said receiving roller, mounted on said camera box; a feed roller mounted on said casing; driving connections therefor to said casing driving means; and a feed pressure roller mounted on the top and bottom walls of said camera box.

20. The combination with a revolubly mounted casing; of a driving means for said casing; a camera box arranged within said casing comprising relatively fixed top, bottom and front walls, adjustable side walls arranged to swing between said top and bottom walls; a film delivery roller mounted on one of said side walls; a film receiving roller mounted on said front wall; guide rollers mounted on said side walls; means for driving said receiving roller, mounted on said camera box; a feed roller mounted on said casing; driving connections therefor to said casing driving means.

21. The combination with a base; of a casing revolubly mounted on said base; a driving means for said casing; a camera box arranged within said casing comprising adjustable side walls; a film delivery roller mounted on one of said side walls; a film receiving roller; guide rollers mounted on said side walls; means for driving said receiving roller; a feed roller; and driving connections therefor to said casing driving means.

22. The combination with a base; of a casing revolubly mounted on said base; a driving means for said casing; a camera box arranged within said casing comprising adjustable side walls; a film delivery roller mounted on one of said side walls; a film receiving roller; guide roller mounted on said side walls; a feed roller; and driving connections therefor to said casing driving means.

23. The combination with a base; of a casing revolubly mounted on said base; a driving means for said casing; a camera box arranged within said casing comprising adjustable side walls; a film delivery roller mounted on one of said side walls; a film receiving roller; means for driving said receiving roller; a feed roller; and driving connections therefor to said casing driving means.

24. The combination with a base; of a casing revolubly mounted on said base; a driving means for said casing; a camera box arranged within said casing comprising adjustable side walls; a film delivery roller mounted on one of said side walls; a film receiving roller; a feed roller; and driving connections therefor to said casing driving means.

25. The combination with a base; of a casing revolubly mounted on said base; a driving means for said casing; a camera box arranged within said casing comprising adjustable side walls; a film delivery roller mounted on one of said side walls; a film receiving roller; guide rollers mounted on said side walls; means for driving said receiving roller; and driving connections therefor to said casing driving means.

26. The combination with a base; of a casing revolubly mounted on said base; a driving means for said casing; a camera box arranged within said casing comprising adjustable side walls; a film delivery roller mounted on one of said side walls; a film receiving roller; guide rollers mounted on said side walls; and driving connections therefor to said casing driving means.

27. The combination with a base; of a casing revolubly mounted on said base; a driving means for said casing; a camera box arranged within said casing comprising adjustable side walls; a film delivery roller mounted on one of said side walls; a film receiving roller; means for driving said receiving roller; and driving connections therefor to said driving means.

28. The combination with a base; of a casing revolubly mounted on said base; a driving means for said casing; a camera box arranged within said casing comprising adjustable side walls; a film delivery roller mounted on one of said side walls; a film receiving roller; and driving connections therefor to said casing driving means.

29. The combination with a revolubly mounted camera; of a driving spring therefor; film delivery and receiving rollers; a film feed roller; a drum connected to said casing; a drum connected to said feed roller; driving cable connections for said drums; and a governor mechanism comprising an axially movable shaft; governor weights connected thereto adapted to shift said shaft axially, a friction member on said shaft; an adjustable friction member coacting with said friction member on said shaft; and a belt connection for said shaft to said feed roller.

30. The combination with a revolubly mounted camera; of a driving spring therefor; film delivery and receiving rollers; a film feed roller; a drum connected to said casing; a drum connected to said feed roller; driving cable connections for said drums; a governor shaft; and a belt connection for said governor shaft to said feed roller.

31. The combination with a revolubly mounted camera; of a driving means for said camera; film delivery and receiving rollers; a film feed roller; a drum connected to said camera; a drum connected to said feed roller; driving cable connections for said drums; and a governor device connected to said driving means.

32. The combination with a revolubly mounted camera; of driving means for said camera; a film feed means; driving-connections therefor to said camera driving means; and a governing means comprising an axially movable shaft, governor weights connected thereto, adapted to act on said shaft; a friction member mounted on said shaft; a coacting friction member; an adjusting shaft on which said coacting friction member is eccentrically mounted; and a belt driving connection for said governor shaft and said feed means.

33. The combination with a revolubly mounted camera; of driving means for said camera; a file feed means; driving connections therefor to said camera driving means; and a governing means comprising an axially movable shaft, governor weights connected thereto, adapted to act on said shaft; a friction member mounted on said shaft; a coacting friction adjustable member; and a belt driving connection for said governor shaft and said feed means.

34. The combination with a base, of a camera revolubly mounted thereon; a driving spring for said camera connected thereto and to said base; film delivery and receiving rollers; a film feed roller; a drum connected to said camera; a drum connected to said feed roller; driving cable connections for said drums; and a governor mechanism comprising a shaft; and a belt connection for said governor shaft to said feed roller.

35. The combination with a revolubly mounted camera; of driving means for said camera; a film feed means; belt driving connections therefor to said camera driving means; and a governing means comprising a shaft; and a belt driving connection for said governor shaft and said feed means.

36. The combination with a base, of a camera revolubly mounted thereon; a driving spring for said camera connected thereto and to said base; film delivery and receiving rollers; a film feed roller; a drum connected to said camera; a drum connected to said feed roller; driving cable connections for said drums; and a governor mechanism comprising a governor shaft; a belt connection for said governor shaft to said feed roller, and a further coacting governor device comprising a pneumatic tube mounted on said base; a valved outlet for said tube; and a roller carried by said camera arranged to be shifted into engagement with said tube.

37. The combination with a base, of a camera revolubly mounted thereon; a driving means for said camera; a film feed means; driving connections therefor to said driving means; and a governor mechanism comprising a governor shaft; a belt connection for said governor shaft to said film feed means; and a further coacting governor device comprising a pneumatic tube mounted on said base, said tube being provided with an exhaust opening and a roller carried by said camera arranged to be shifted into engagement with said tube.

38. The combination with a base; of a camera revolubly mounted thereon; driving means for said camera; and a governor device comprising a pneumatic tube mounted on said base, a valved outlet for said tube, and a roller carried by said camera arranged to travel on said tube.

39. The combination with a base; of a camera revolubly mounted thereon; driving means for said camera; and a governor device comprising a pneumatic tube mounted on said base, an outlet for said tube, and a roller carried by said camera arranged to travel on said tube.

40. The combination with a base; of a camera revolubly mounted thereon; driving means for said camera; and a governor therefor, comprising a pneumatic tube, a valved outlet for said tube, and a member arranged to travel on said tube as said camera revolves.

41. The combination with a base; of a camera revolubly mounted thereon; driving means for said camera; and a governor therefor, comprising a pneumatic tube, an outlet for said tube, and a member arranged to travel on said tube as said camera revolves.

42. The combination with a base; of a casing; a driving spring for said casing connected thereto and to said base; a film feed roller; a drum connected to said casing to be revolved therewith; a drum connected to said feed roller; and a pair of driving cables or cords connected to said drums to be oppositely wound thereon, said drums being provided with an intermediate peripheral flange for preventing the over-laying of said cables.

43. The combination with a base; of a casing; a driving spring for said casing connected thereto and to said base; a film feed roller; a drum connected to said casing to be revolved therewith; a drum connected to said feed roller; and a pair of driving cables or cords connected to said drums to be oppositely wound thereon.

44. In a camera the combination with a receiving roller, of driving means therefor, comprising driven member, and a spirally coiled spring connected to said driven member and adapted to engage one end of said film receiving roller.

45. In a camera the combination with a receiving roller, of driving means therefor, comprising a driving spring, a driving pulley connected thereto, a driven pulley, a driving cable secured to said pulleys, and a spirally coiled spring connected to said driven pulley and adapted to engage one end of said receiving roller.

In witness whereof, I have hereunto set my hand and seal in the presence of two witnesses.

IRA O. PERRING. [L. S.]

Witnesses:
F. GERTRUDE TALLMAN,
L. G. GREENFIELD.